J. E. WISNER.
HORSE HAY-RAKE.

No. 192,318. Patented June 19, 1877.

Witnesses
Grenville Lewis
M. Church

Inventor
James E. Wisner
By Hill, Ellsworth & Spear
His Attys.

UNITED STATES PATENT OFFICE.

JAMES E. WISNER, OF FRIENDSHIP, NEW YORK.

IMPROVEMENT IN HORSE HAY-RAKES.

Specification forming part of Letters Patent No. 192,318, dated June 19, 1877; application filed August 28, 1876.

*To all whom it may concern:*

Be it known that I, JAMES E. WISNER, of Friendship, in the county of Allegany and State of New York, have invented certain new and useful Improvements in Horse Hay-Rakes, and I do hereby declare the following to be a full, clear, and exact description of the same, reference being had to the accompanying drawings forming part of this specification.

My invention relates to horse hay-rakes, and consists of two main and some subordinate features, which I proceed particularly to set forth.

The first of the more important points relates to the connection of the frame with the axle, whereby the weight of the axle may be greatly lessened, and the second to an improved construction of the rake-head, in order to bring it near the axle of the machine on which it tilts. The other features will be described in order.

In horse hay-rakes, as hitherto made, the weight of the frame and the driver riding thereon is borne near the center of the axle. This makes it necessary that the axle should be stout and heavy, in order to avoid bending and springing, and thus the weight and cost of the machine were necessarily increased.

In this part of my invention I distribute the weight of the frame and driver throughout the entire length of the axle, between the hubs, by locating the connections of the said frame to the axle next the inner ends of the hubs, and also at one or more intermediate points.

Figure 1:
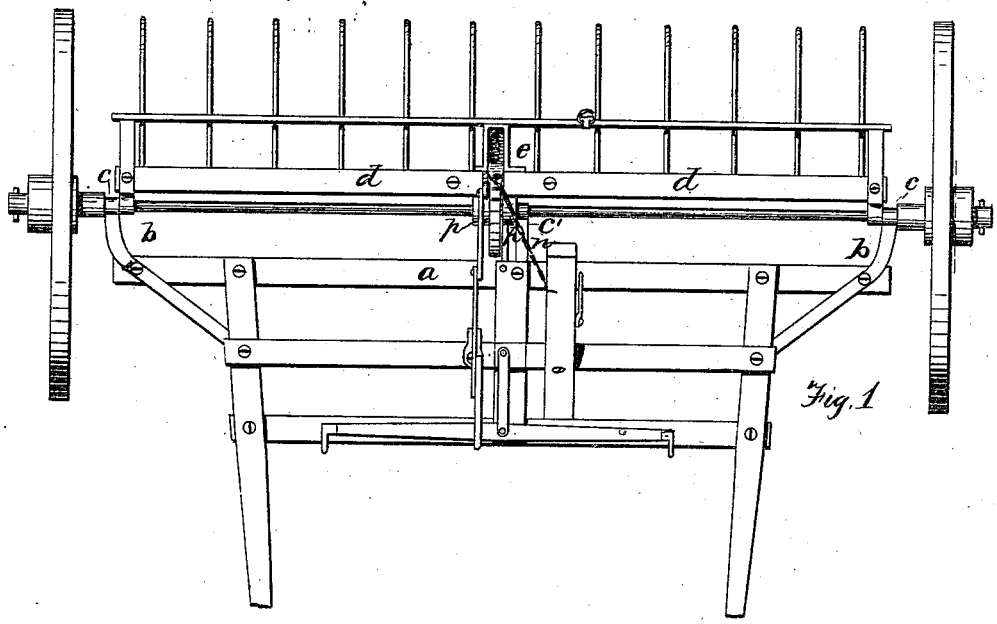

In Figure 1 of the drawings the main cross-bar of the frame, next the axle, is represented at $a$. To this the shafts are connected, and there are other suitable cross-bars and frame-work of ordinary construction.

This frame, which may obviously be greatly varied without departing from the spirit of my invention, I connect to the axle, in this case by iron bars $b\ b$, at the points $c\ c$, next the hubs of the wheels. The form of these connecting-bars may also be varied, the essential element being the points of connection with the axle. I may also make similar connections near the middle of the axle, at $c'$, in proximity to the ratchet-wheel, by which the rotation of the axle is made to raise the rake and dump the load. By this construction the draft, like the weight, is uniformly distributed, and not only is the weight of the axle greatly lessened, but the draft is steadier. The principal weight is thrown upon the axle next the hubs, where the strain on the axle is the least possible, and the cross-bar $a$ lends its whole strength to the axle itself. This cross-bar may be brought as near the axle as the ratchet-wheel will permit.

In the construction which I have shown the bent bars $b\ b$ are bolted to the ends of the bar $a$, and bending inward are secured firmly to the shafts, thus serving to brace the parts. The central connection $c'$ lends its support where the strain of the dumping mechanism falls.

Obviously as many intermediate connections between the bar and shaft may be made as may be deemed necessary.

The second part of my invention is shown more clearly in respect to the main element thereof in Fig. 1. In machines of this class, the rake is tilted by means of a ratchet-wheel, or some equivalent mechanism, on the axle, and moving therewith. But it is highly important to bring the rake-head as near as possible to the axle, on which the rake tips, in order to lessen the leverage which the head would have on the lifting mechanism, and that the weight with which it would fall when released may be as small as possible. This object I accomplish by cutting the head of the rake in two parts and separating them far enough to admit the ratchet-wheel in the space between the parts, thus permitting the head to be located nearer to the axle than could be otherwise done.

In carrying out this invention there are details of construction which will be fully described.

In Fig. 1 of the drawing the divided rake-head is marked $d\ d$. The outer ends are held in a strap, which passes around the axle, and extends outward and affords support for the tooth-board. This strap may be greatly varied in form with the same effect. The inner ends of the parts of the axle are held in a casting, $e$, which extends under these ends, and is bolted thereto, firmly holding them in place. A part of this casting, marked $e'$, extends rearward, and serves to support, midway, the tooth-board. This part is recessed, and in it is located the spring which holds the pawl $h$ out of gear. Another part, $e''$, extends around as a case, and protects the wheel $i$ against clogging by the hay. The pawl is pivoted at $o$, and to its arm $m$ is attached a chain or cord, $n$, the other end of which is attached to a standard, and which serves to throw the pawl into gear by pressure of the foot thereon. This pawl connects the rake-head to the ratchet, and the rotation of the wheels thereby raises the rake until the arm $m$ strikes a stop and releases the pawl from the ratchet, when the rake falls in the usual way.

It will be observed that the rake-head is brought in close proximity to the axle, to which it is pivoted. It thus is easily raised, and falls lightly, two very desirable ends effectually and simply accomplished.

Figure 2:
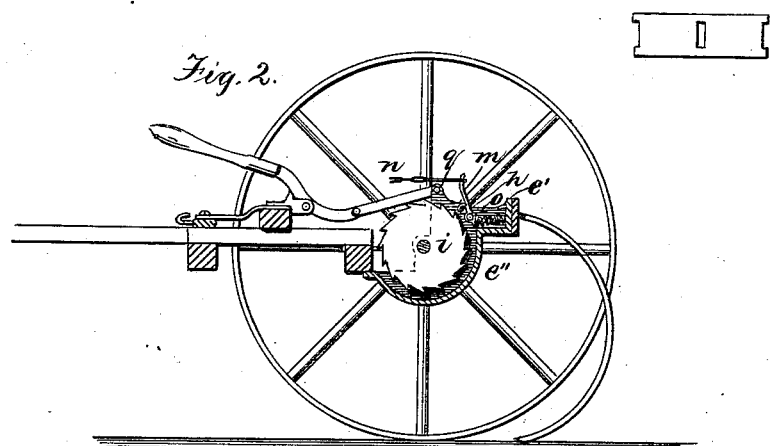

The construction of the casting and the arrangement of the pawl are shown more clearly in Fig. 2, in respect to the rearward extension and the case.

In Fig. 1, at $p\ p$, are shown those parts through which the axle passes, and which turn thereon, serving as the central supports for the rake. A small projection, $q$, Fig. 2, serves for the attachment of the ordinary hand-lifting mechanism. The outer bearings of the rake-head are shown near those of the frame, and near the hubs of the wheels.

Figure 3:

Another feature employed in my machine is shown in Fig. 3. This shows the outer ends of the wheel-hub with the pawl connected to the axle. The latter, with its spring, is of ordinary construction, but the teeth into which the pawl catches are plain cogs, alike on both sides. This allows the same casting to be used for both wheels, it being only necessary to reverse the position of the pawl for the opposite end of the axle.

I claim as my invention—

1. In a horse hay-rake a divided head, hinged near the revolving axle, with the lifting mechanism on the revolving axle, moving in the space between the parts, as set forth.

2. The divided head, hinged to the revolving axle at the outer ends, and supported at the inner upon a casting, through a part of which the said axle passes, as set forth.

3. The casting $e$, formed with a rearward extension, $e'$, for supporting the tooth-board, said extension being recessed to receive the spring, substantially as described.

4. The casting $e$ supporting the divided rake-head, and formed with shell or casing $e''$ adapted for the reception of the ratchet, as set forth.

JAS. E. WISNER.

Witnesses:
FRANK MCKENNY,
JNO. D. PATTEN.